US006470609B1

(12) United States Patent
Dannenbaum

(10) Patent No.: US 6,470,609 B1
(45) Date of Patent: Oct. 29, 2002

(54) METHOD AND APPARATUS FOR PROMOTING THE SALE OF A PRODUCT

(76) Inventor: Kenneth D. Dannenbaum, 1940 E. Thunderbird Rd. No. 105, Phoenix, AZ (US) 85022

( * ) Notice: Subject to any disclaimer, the term of this patent is extended or adjusted under 35 U.S.C. 154(b) by 0 days.

(21) Appl. No.: 09/542,219

(22) Filed: Apr. 4, 2000

(51) Int. Cl.[7] .......................... F16K 37/00; B05B 1/08

(52) U.S. Cl. .......................... 40/316; 40/332; 116/277; 239/600

(58) Field of Search .................... 40/316, 331, 299.01, 40/666, 673, 332, 594, 630; D20/42; 116/277; 239/71, 381, 600

(56) References Cited

U.S. PATENT DOCUMENTS 2,503,114 A * 4/1950 Kennard .................... 40/10.5
4,246,712 A * 1/1981 Vander Wall ................ 40/316
4,656,767 A * 4/1987 Tarrant ........................ 40/316
5,316,216 A * 5/1994 Cammack et al. ............ 239/71
5,826,356 A * 10/1998 Lapp .......................... 40/310
6,052,929 A * 4/2000 Canadas ...................... 40/331
6,129,291 A * 10/2000 Commeville ................ 239/24

* cited by examiner

*Primary Examiner*—Tan Nguyen
*Assistant Examiner*—Dalena Tran
(74) *Attorney, Agent, or Firm*—Tod R. Nissle, P.C.

(57) ABSTRACT

A method and apparatus for promoting the sale of a showerhead enables a prospective customer to evaluate the showerhead in a relaxed setting and separate from competing showerheads, while at the same time providing in a fixed, permanent, readily viewed location the information necessary to contact the manufacturer or seller of the showerhead.

4 Claims, 4 Drawing Sheets

METHOD AND APPARATUS FOR PROMOTING THE SALE OF A PRODUCT

This invention relates to a method and apparatus for promoting the sale of a product.

More particularly, the invention relates to a method and apparatus for promoting the sale of a showerhead.

Various methods and apparatus have been devised to market a product. Many such methods require that a significant expense be incurred. For example, faucets, showerheads and other plumbing equipment typically requires the construction of an in-store display which permits customers to view each faucet, sink, shower head, etc. offered by a manufacturer. Since there are numerous manufacturers of plumbing hardware, such displays typically are relatively large and expensive to construct. Further, since there are numerous manufacturers, the displays offer a wide array of competing plumbing products and it is difficult for a customer to focus carefully on one particular faucet or shower head. Another disadvantage of in-store displays is that when the store is crowded, for example in the case of a HOME DEPOT (TM), it is difficult for a customer to relax and carefully examine a product. Still another disadvantage of in-store displays, or for that matter of displays on the HOME SHOPPING NETWORK on television, is that practically speaking it is difficult for a customer to carefully examine a plumbing product or to see the plumbing product in actual operation. In a store, the plumbing products are typically arrayed on a wall, so the customer must view the product from a distance, and often cannot actually touch the product unless the customer opens a box in which the product is packaged--a procedure stores frown on. On television, the customer cannot actually touch the product and often is unable to view all the features of the products. Television shopping networks tend to display only the features they think will sell the product. Finally, television shopping networks operate like an auction, giving viewers only a limited time so the viewers are urged into making a decision to buy the product based only on the information selected and provided by the television shopping network.

Accordingly, it would be highly desirable to provide an improved method and apparatus for displaying a product which would cost almost nothing, would be exceedingly simple to install, would enable a customer to see the product in operation, and would insure that a customer could focus on, touch, and examine the product to the exclusion of any other competing product.

Therefore, it is a principal object of the invention to provide an improved method and apparatus for displaying a product.

A further object of the invention is to provide an improved method and apparatus for displaying a product which costs almost nothing to manufacture and is exceedingly simple to install.

Another object of the invention is to provide an improved method and apparatus for displaying a showerhead which insures that a potential customer can focus exclusively on the showerhead, and not on competing showerheads, in an environment where the consumer ordinarily is relaxed and can not view competing products.

These and other, further and more specific objects and advantages of the invention will be apparent to those skilled in the art from the following detailed description thereof, taken in conjunction with the drawings, in which.

Figure 1:
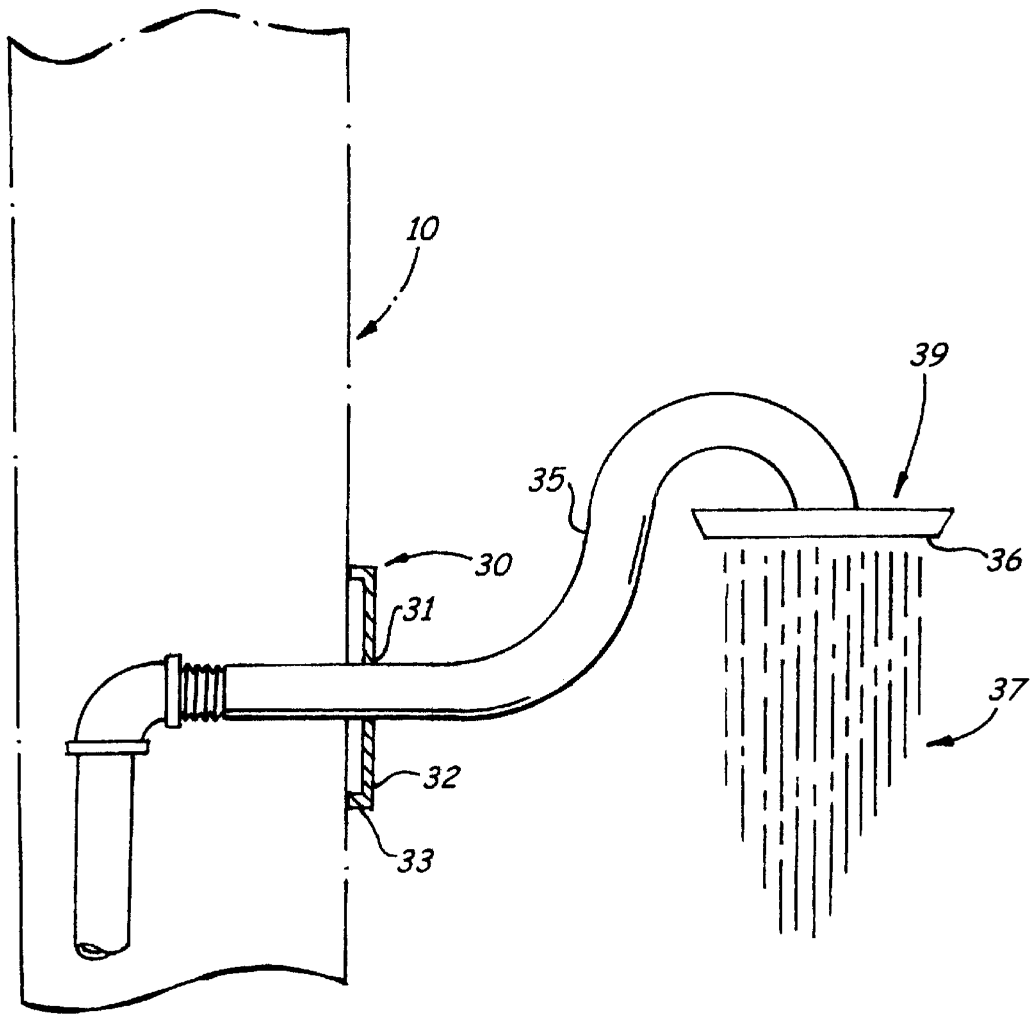
FIG. 1 is a side elevation view illustrating an apparatus and method in accordance with the invention.

Briefly, in accordance with my invention, I provide an improved method for promoting the sale of showerheads to an individual while the individual takes a shower in a shower stall. The method includes the steps of providing a showerhead shaped and dimensioned to emit water in substantially vertical parallel paths of travel; and, providing an escutcheon having an aperture, and an outer viewable surface which is at least three inches wide, extends around the aperture, and includes indicia in a selected orientation indicating how to obtain information on purchasing the showerhead. The method also includes the steps of orienting in the shower stall the escutcheon such that the outer surface faces outwardly; of installing the escutcheon on a shower arm in the shower stall by sliding the aperture over the shower arm such that the outer surface continues to face outwardly; of orienting the escutcheon on the shower arm in a selected orientation to position the indicia in an orientation to be viewed and read by an individual taking a shower; and, of installing the showerhead on the shower arm in the shower.

In another embodiment of my invention, I provide improved apparatus for promoting the sale of a showerhead to an individual while the individual takes a shower in a shower stall. The improved apparatus comprises an escutcheon having an aperture; and, an outer viewable surface at least three inches wide, extending around the aperture, and including indicia indicating how to obtain information on purchasing the showerhead. The indicia are upright and readable when said escutcheon is in a selected orientation, and, are each at least five millimeters in height.

In a further embodiment of the invention, I provide an improved method for promoting the sale of a showerhead to an individual while the individual takes a shower in a shower stall. The improved method includes the steps of providing a commercial hotel in which customers pay to stay over at least one night. The hotel includes a plurality of rooms, a shower stall in each of the rooms, and a shower arm in each of the shower stalls. The method also includes the steps of providing a plurality of showerheads and providing a plurality of escutcheons. Each escutcheon has an aperture; and, an outer viewable surface at least three inches wide, extending around the aperture, and including indicia in a selected orientation indicating how to obtain information on purchasing said showerhead. The method also includes the steps, in each of the shower stalls, of orienting one of the escutcheons such that the outer surface faces outwardly, of installing the escutcheon on the shower arm in the shower stall by sliding the aperture over the shower arm such that the outer surface continues to face outwardly, of orienting the escutcheon on the shower arm in selected orientation to position the indicia in an orientation to be viewed and read by an hotel customer taking a shower in the shower stall, and, installing the showerhead on the shower arm in the shower stall.

Turning now to the drawings, which show the presently preferred embodiments of the invention for the purpose of illustrating the practice thereof and not be way of limitation of the scope of the invention, and in which like characters refer to corresponding elements throughout the several views, FIG. 1 illustrates a shower apparatus constructed in accordance with the principles of the invention. The shower includes a wall 10 in a shower stall. The stall can include only wall 10 with a curtain drawn around the other sides of the stall. The stall ordinarily, however, is enclosed on three sides, with wall 10 comprising one of three sides. The bottom of the stall can comprise a bathtub (in the case of a combination bathtub—shower) or can simply comprise a shower floor. As would be appreciated by those of skill in the art, the shape and dimension and construction of the shower stall can vary widely as desired.

Hollow shower arm 35 extends into wall 10. The shape and dimension and construction of arm 35 can vary as desired. Arm 35 typically includes an externally threaded proximate end which, as shown in FIG. 1, extends into wall 10 and turns into an internally threaded fitting through which water flows into arm 35 and out a showerhead 39 connected to the other distal end of arm 35. Escutcheon 30 fits over arm 35 and against wall 10 in the manner shown in FIG. 1 and functions to cover the opening through which arm 35 extends into wall 10. Escutcheon 30 includes circular opening 31 formed through the center of escutcheon 30, includes circular front surface 32 extending around aperture 31, and includes circular peripheral edge 33. While escutcheon 30 preferably has a circular shape which includes a circular peripheral edge 33, escutcheon 30 and can be hexagonal, square, or any other desired shape and dimension.

Figure 2:
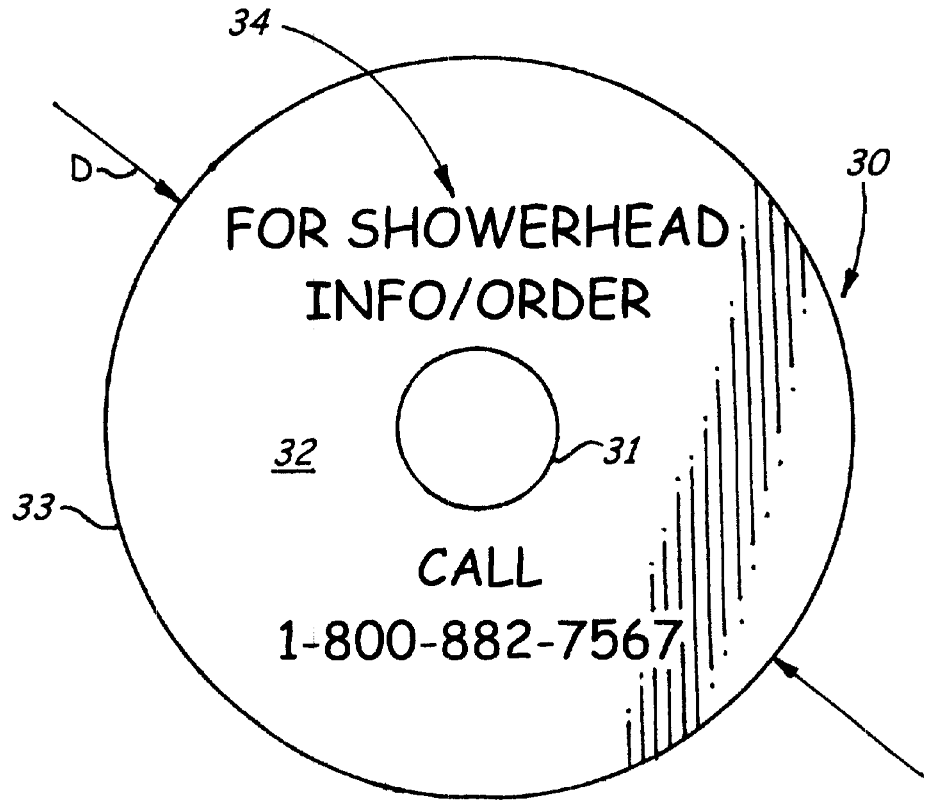
FIG. 2 is a top view illustrating a shower arm escutcheon constructed in accordance with the principles of the invention.

The width, indicated by arrows D in FIG. 2, of escutcheon 30 is critical and is equal to or greater than two and three-quarters inches, preferably equal to or greater than three inches. The width D of a conventional circular escutcheon 30 for a shower arm 35 is about two and one-half inches. This is not believed sufficient to enable the escutcheon to function in accordance with the invention and to provide indicia 34 which will be read by an individual taking a shower. While the smallest width D of escutcheon 30 is, as noted, in the range of two and three-quarters inches to three inches, the greatest width D of escutcheon 30 can vary as desired and can, for example, be twelve inches or greater. Presently however, the greatest width D of escutcheon 30 is preferably six inches, and most preferably four inches.

Indicia 34 are printed on, impressed in, attached to, or otherwise formed on circular front surface 32. Indicia 34 perform the function of indicating where the individual taking a shower can obtain information concerning the showerhead 35. The information obtained can concern the purchase, sale, use, or repair of showerhead 39 or any other desired information. The information set forth by indicia 34 can also concern the purchase, sale, use, or repair of a product or products other than showerhead 39.

Figure 3:
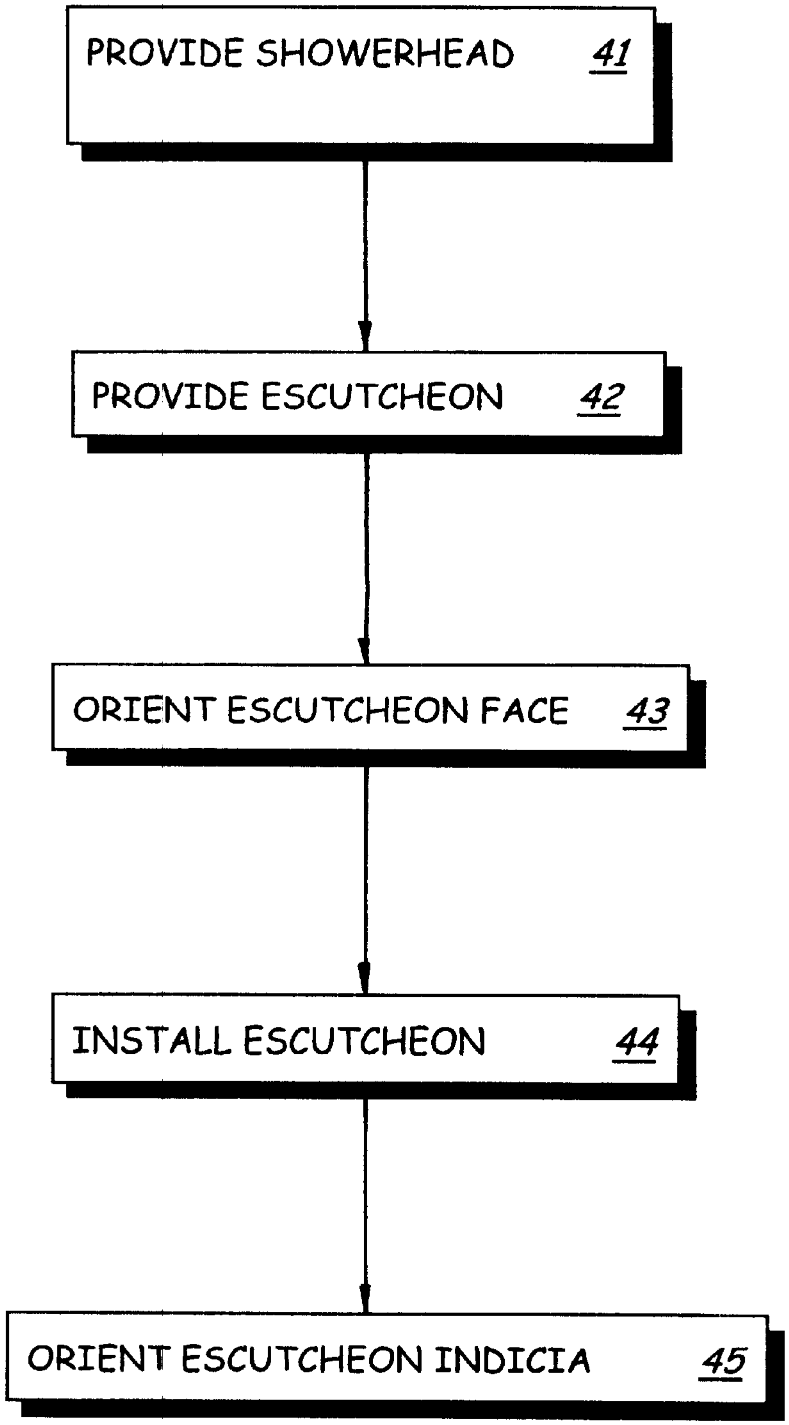
FIG. 3 is a flow chart illustrating one method of promoting the sale of a product in accordance with the invention; and, FIG. 4 is a flow chart illustrating another method of promoting the sale of a product.

FIG. 3 illustrates a method in accordance with the invention including the step 41 "provide showerhead", the step 42 "provide escutcheon", the step 43 "orient escutcheon face" outwardly, the step 44 "install escutcheon" on shower arm, and, the step 45 "orient escutcheon indicia" so an individual taking a shower can read the indicia.

Figure 4:
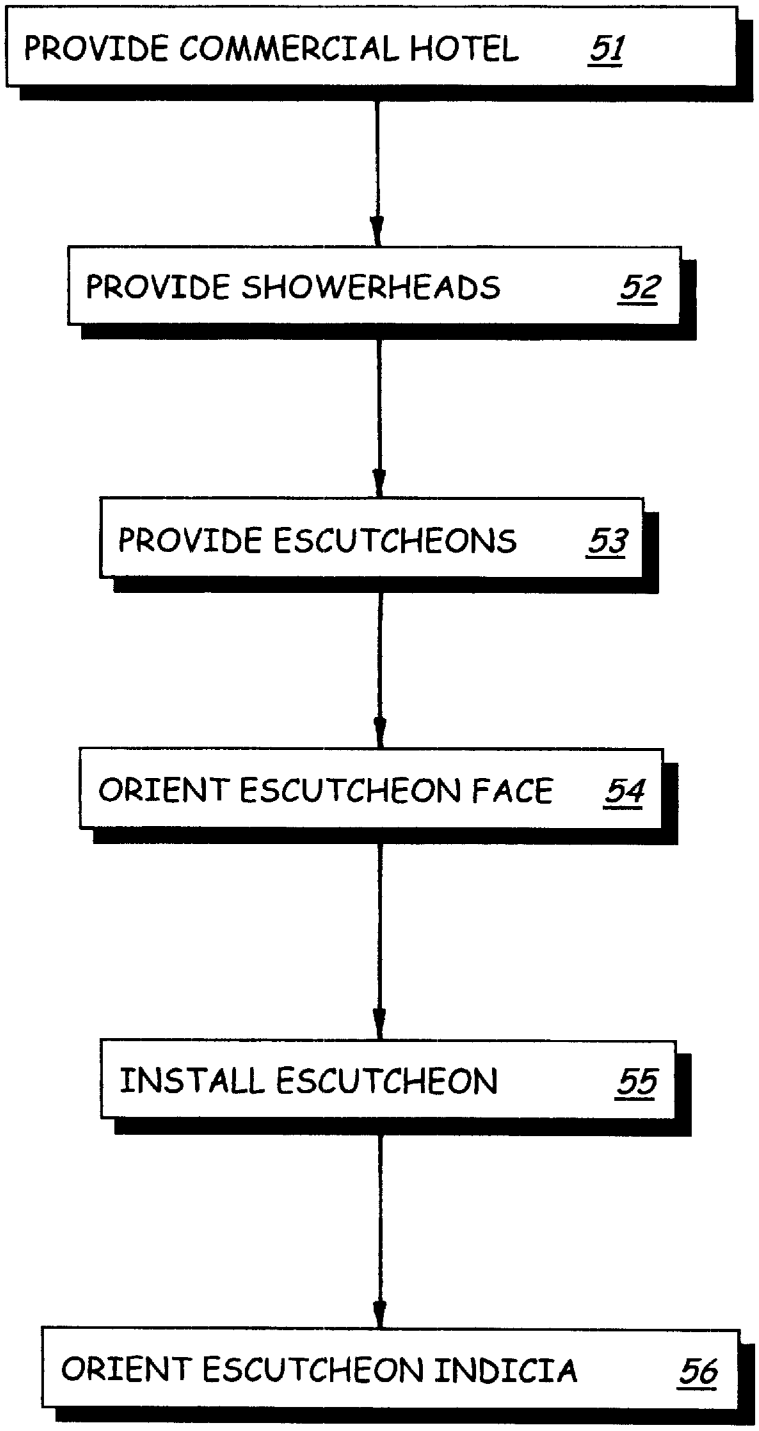

FIG. 4 illustrates another method in accordance with the invention including the step 51 "provide commercial hotel" with a plurality of rooms each having a shower stall with a shower arm, the step 52 "provide showerheads" for each shower arm, the step 53 "provide escutcheons", the step 54 "orient escutcheon face" outwardly, the step 55 "install escutcheon" on shower arm, and the step 56 "orient escutcheon indicia" in a generally upright orientation to permit a person in the shower to read the indicia.

In use, at least one escutcheon 30 is provided. The indicia 34 imprinted on the escutcheon are, when the escutcheon 30 is properly oriented, upright so the indicia 34 can be read. In other words, the indicia 34 are not upside down. However, the indicia 34 can be rotated through an angle of ninety degrees and be in a sideways orientation and still be read. The indicia must not, however, be upside down. The escutcheon 30 is oriented such that outer surface 32 faces away from wall 10, i.e., such that surface 32 faces showerhead 39. Escutcheon 30 is then installed on arm 35 adjacent or against wall 10 in the manner illustrated in FIG. 1. Escutcheon 30 is typically installed by, without the showerhead 39 being installed on the distal end of arm 35, sliding escutcheon 30 over the distal end of arm 35 and along arm 35 toward wall 10 until escutcheon 30 is adjacent wall 10. Alternatively, the externally threaded proximate end of arm 35 can be turned out of the L-shaped fitting in wall 10 and pulled out of wall 10, after which escutcheon 30 is slipped over the proximate end and slid along arm 35 toward showerhead 39 until escutcheon 30 is at the position along arm 35 illustrated in FIG. 1. The proximate end of arm 35 is then inserted back in wall 10 and is threaded into the L-shaped member until escutcheon 30 is adjacent wall 10.

After escutcheon 30 is on arm 35 and adjacent wall 10, escutcheon 30 is manually, or with the use of a tool, rotated around the elongate central axis of arm 35 until indicia 34 are in the upright orientation illustrated in FIG. 2 and can be readily read by a person taking a shower. When escutcheon 30 is in its final fixed position adjacent wall 10, indicia 34 can not appear upside down to a person taking a shower using water emanating from showerhead 39, i.e., indicia 34 can not—when escutcheon 30 in a fixed position on arm 35—be in an orientation in which they are rotated from the position of FIG. 2 through an arc of one hundred and eighty degrees.

Showerhead 39 is then attached to the distal end of arm 35 in the position illustrated in FIG. 1. If escutcheon 30 is installed over the externally threaded proximate end of arm 35, the showerhead can be installed on the distal end of arm 35 prior to mounting escutcheon 30 on arm 35. While the construction of showerhead 39 and the water streams produced by showerhead 39 can vary as desired, it is presently preferred that showerhead 39 be designed such that streams or droplets of wall are emitted downwardly from the bottom surface 36 of showerhead in vertically oriented parallel paths 37 of travel.

While the shower apparatus of the invention can be utilized in any shower stall, a principal embodiment of the invention consists of installing escutcheon 30 and showerhead 39 in a commercial hotel where guests pay to stay overnight for one or more nights. This environment is desirable because when a guest takes a shower, there are no competing shower heads present and there likely are few, if any, other distractions present. If the guest likes the shower head, the guest can call the 1-800 number to obtain information on the shower head, or can, if an e-mail address, postal address, or fax number is formed on surface 32, write down and use this information to obtain information concerning the showerhead 39.

Having described the presently preferred embodiments of the invention in such terms as to enable those skilled in the art to understand and practice the invention, and having described the presently preferred embodiments thereof,

I claim:

1. A method for a hotel to inform a customer where to obtain information concerning a showerhead, said hotel including a plurality of rooms, a shower stall in each of said rooms and including a wall, and a shower arm in each of said shower stalls extending outwardly from said wall, the method comprising the steps of (a) providing a plurality of showerheads;

(b) providing a plurality of escutcheons each having
(i) an aperture, and
(ii) an outer viewable surface
having an outer perimeter that is at least two and three-quarters inches wide,
extending around said aperture, and
including indicia indicating how to obtain information on said showerhead;

(c) in each of said shower stalls installing one of said escutcheons and one of said shower heads such that
(i) said escutcheon is on said shower arm in said shower stall so that said outer surface faces outwardly away from said wall,
(ii) said escutcheon is oriented on said shower arm in a selected orientation to position said indicia to be viewed and read by an individual taking a shower in said shower stall, and
(iii) said showerhead is installed on said shower arm in said shower stall;

(d) accepting payment from the customer to stay overnight in one of said rooms; and, (e) having the customer take a shower in said shower stall in said one of said rooms.

2. A method for a customer to obtain information concerning a showerhead, the method including the steps of (a) providing a hotel including
(i) a plurality of rooms,
(ii) a shower stall in each of said rooms and including a wall, and
(iii) a shower arm in each of said shower stalls extending outwardly from said wall;

(b) providing a plurality of showerheads;

(c) providing a plurality of escutcheons each having
(i) an aperture, and
(ii) an outer viewable surface
having an outer perimeter that is at least two and three-quarters inches wide,
extending around said aperture, and
including indicia indicating how to obtain information on said showerhead;

(d) in each of said shower stalls installing one of said escutcheons and one of said shower heads such that
(i) said escutcheon is on said shower arm in said shower stall so that said outer surface faces outwardly away from said wall,
(ii) said escutcheon is oriented on said shower arm in a selected orientation to position said indicia to be viewed and read by an individual taking a shower in said shower stall, and,
(iii) said showerhead is installed on said shower arm in said shower stall;

(e) having the customer check into the hotel and pay to stay overnight in one of said rooms; and, (f) having the customer take a shower to view said indicia on said escutcheon in said one of said rooms.

3. A method for a hotel to inform a customer where to obtain information concerning a showerhead, said hotel including a plurality of rooms, and a shower stall in each of said rooms and including a wall, the method comprising the steps of (a) providing a plurality of showerheads;

(b) providing a plurality of shower arms;

(b) providing a plurality of escutcheons each having
(i) an aperture, and
(ii) an outer viewable surface
having a perimeter that is at least two and three-quarters inches wide,
extending around said aperture, and
including indicia each at least five millimeters high and indicating how to obtain information on said showerhead;

(c) in each of said shower stalls installing one of said escutcheons, one of said shower arms, and one of said shower heads such that
(i) said escutcheon is on said shower arm in said shower stall so that said outer surface faces outwardly away from said wall,
(ii) said escutcheon is oriented on said shower arm in a selected orientation to position said indicia to be viewed and read by an individual taking a shower in said shower stall,
(iii) said showerhead is installed on said shower arm in said shower stall, and,
(iv) said shower arm extends outwardly from said wall;

(d) accepting payment from the customer to stay overnight in one of said rooms; and, (e) having the customer take a shower to view said indicia on said escutcheon in said one of said rooms.

4. A method for a customer to obtain information concerning a showerhead, the method including the steps of (a) providing a hotel including
(i) a plurality of rooms, and
(ii) a shower stall in each of said rooms and including a wall;

(b) providing a plurality of showerheads;

(c) providing a plurality of shower arms;

(d) providing a plurality of escutcheons each having
(i) an aperture, and
(ii) an outer viewable surface
having an outer perimeter that is at least two and three-quarters inches wide,
extending around said aperture, and
including indicia each at least five millimeters high indicating how to obtain information on said showerhead;

(e) in each of said shower stalls installing one of said escutcheons, one of said shower arms, and one of said shower heads such that
(i) said escutcheon is on said shower arm in said shower stall so that said outer surface faces outwardly away from said wall,
(ii) said escutcheon is oriented on said shower arm in a selected orientation to position said indicia to be viewed and read by an individual taking a shower in said shower stall,
(iii) said showerhead is installed on said shower arm in said shower stall, and
(iv) said shower arm extends outwardly away from said wall;

(f) having the customer check into the hotel and pay to stay overnight in one of said rooms; and, (g) having the customer take a shower to view said indicia on said escutcheon in said one of said rooms.

* * * * *